United States Patent [19]

Müller

[11] Patent Number: 4,627,139
[45] Date of Patent: Dec. 9, 1986

[54] METHOD FOR MANUFACTURING CERAMIC CAPACITORS

[75] Inventor: Rolf Müller, Auenwald-Unterbüden, Fed. Rep. of Germany

[73] Assignee: Vitramon, Incorporated, Monroe, Conn.

[21] Appl. No.: 506,295

[22] Filed: Jun. 21, 1983

[51] Int. Cl.$^4$ .................... H01G 4/06; H01G 1/14
[52] U.S. Cl. .................... 29/25.42; 361/310
[58] Field of Search ............ 361/433 C, 433 S, 306, 361/308, 309, 310, 321 C, 400, 404, 405; 29/25.42

[56] References Cited

U.S. PATENT DOCUMENTS

| | | | |
|---|---|---|---|
| 3,129,490 | 4/1964 | Rollefson | 361/310 X |
| 3,806,766 | 4/1974 | Fanning | 361/433 S X |
| 4,168,520 | 9/1979 | Coleman et al. | 361/321 C X |
| 4,255,779 | 3/1981 | Meal | 361/433 C X |
| 4,268,942 | 5/1981 | Meal et al. | 29/25.42 |
| 4,293,890 | 10/1981 | Varsane | 361/310 |

Primary Examiner—Donald A. Griffin
Attorney, Agent, or Firm—Cifelli, Frederick & Tully

[57] ABSTRACT

Method for making novel, dip-coated monolithic ceramic capacitors from a pair of parallel integral multi-lead carrier strips 10 and 10a. Each of a plurality of capacitor bodies 18 is positioned and restrained between the wide contact faces 15, 15a of a pair of leads 13, 13a, soldered and dip-coated while the leads 13 and 13a are retained as integral parts of the carrier strips 10 and 10a. The present method employs a support member 19 for receiving and supporting a plurality of spaced capacitor bodies 18, means 37 for supplying the capacitor bodies 18 to said support member 19 and means 29 and 30 for holding two opposed, parallel lead carrier strips 10 and 10a in position such that the top contact faces 15 and 15a of pairs of opposed leads 13 and 13a, one on each of the strips, are positioned against the end terminals 21 and 22 of each of the capacitor bodies 18 and means 32 for pressing said opposed contact faces 15, 15a against said end terminals 21, 22 with sufficient force to provide an assembly which can be inverted and dipped into a solder bath to solder the contact faces to the capacitor bodies. Subsequently, the lead connections 14 and 14a of alternate soldered capacitors may be severed adjacent the base ribbon 11 and 11a of each of the carrier strips 10 and 10a so that one-half of the total number of soldered capacitors remain attached to each of the carrier strips. The soldered capacitors are dip-coated with insulation composition 24 and the individual capacitors are severed from the base ribbon 11 and/or 11a to which they are attached.

8 Claims, 7 Drawing Figures

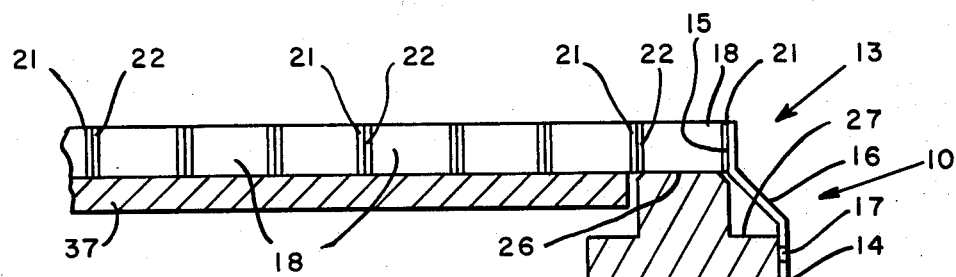
FIG. 3
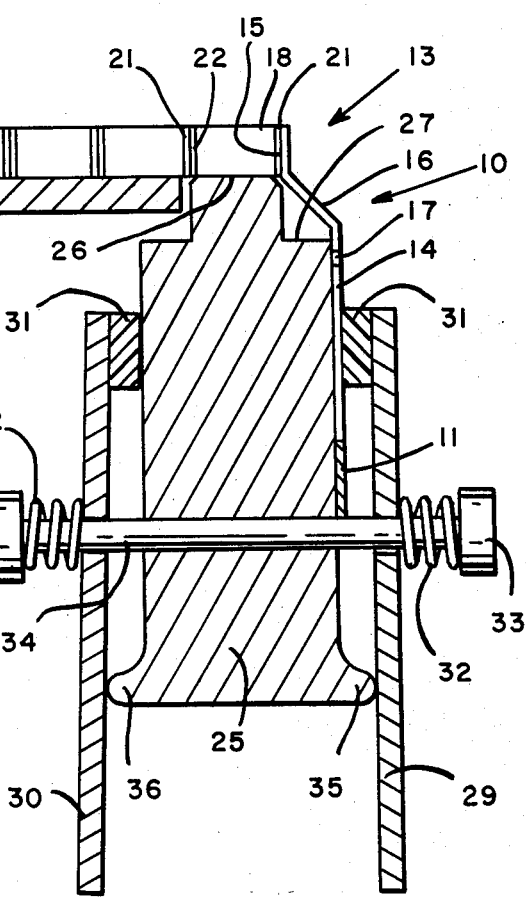
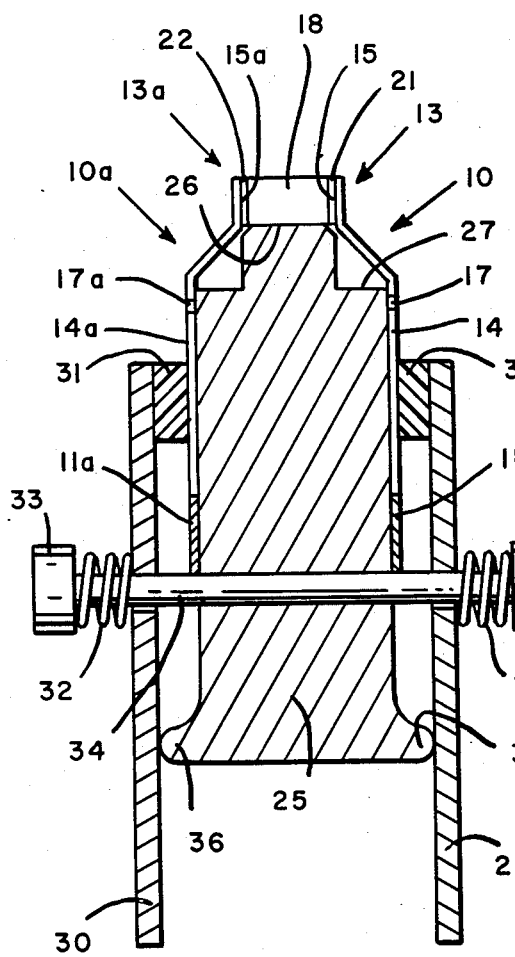
FIG. 4
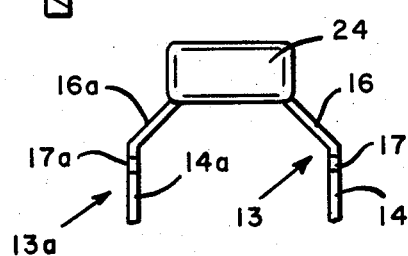
FIG. 6
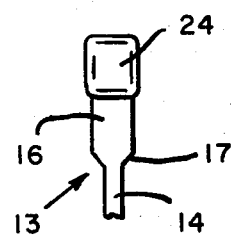
FIG. 7
FIG. 5

4,627,139

METHOD FOR MANUFACTURING CERAMIC CAPACITORS

BACKGROUND OF THE INVENTION

The present invention relates to a novel in-line manufacturing process for producing monolethic ceramic capacitors on elongate lead carriers or sprocketed ribbons.

Reference is made to U.S. Pat. No. 4,293,890, commonly assigned, over which the present method and products represent an improvement. The present capacitors have improved tilt-resistance under the stress of soldering the capacitors to an installation such as to a printed wiring board.

According to U.S. Pat. No. 4,293,890 a single elongate carrier or sprocketed ribbon is punched or otherwise formed to provide a base strip or ribbon supporting a plurality of integral parallel conductive leads, each having a thickness corresponding to the thickness of the carrier, a width greater than said thickness and a U-shaped clamp formed at the upper end thereof. The clamps of adjacent pairs of the conductive leads are designed to receive and hold an interposed elongate ceramic capacitor body adjacent the ends thereof in electrically-conductive contact therewith. A said capacitor body is mounted between the clamps of each adjacent pair of said leads in a direction corresponding to the length of the carrier strip, soldered thereto, dipped or coated with an insulating composition to encapsulate the body and the upper ends of conductive leads, and eventually the other ends of the conductive leads are severed from the carrier to provide individual capacitors, each having a pair of leads extending down from the same side of the capacitor body and being thinner in the direction transverse of the capacitor body than in the direction axial thereto.

The methods and products of U.S. Pat. No. 4,293,890 have many advantages. For example, the upper ends of the conductive leads have shoulder areas of enlaged width which provide an improved solder joint and which limit the length of the lead which can extend through the mounting holes of a circuit board, thereby insuring that the capacitor body will have defined standoff or spacing above the surface of the contact board to permit cleaning the areas of the board beneath the capacitor body. The distance between the shoulder areas and the capacitor body is maintained fixed and uniform by the fixed, uniform location of the base of the U-shaped clamps on the conductive leads.

However, the method and products of U.S. Pat. No. 4,293,890 have at least one inherent disadvantage. Capacitors produced according to said patent are unabalanced or non-symmetrical, and tend to tilt or bend towards the surface of the wiring board during the step of soldering the capacitors thereto. This tilting is due to the fact that the leads are offset to one side and also are thinnest and weakest in the direction perpendicular to or transverse the axis of the capacitor body, thereby giving them reduced resistance to tilting or bending in said direction and permitting the capacitor body to lay over against the surface of the writing board in spite of the presence of the lead shoulders which are designed to provide standoff.

SUMMARY OF THE INVENTION

The present invention provides methods and products which overcome the disadvantages of U.S. Pat. No. 4,293,890 and which result in improved symmetrical capacitors having tilt-resistance or increased strength of the conductive leads in a direction perpendicular to the axis of the capacitor body.

According to the present invention two elongate lead carriers are formed, each providing a plurality of parallel conductive leads which are similar to the leads of U.S. Pat. No. 4,293,890 except that the U-shaped clamps of the latter are omitted. Parallel lead carriers are aligned and spaced so that the leads on each carrier strip face toward each other and the upper sections of the leads, comprising wide contact faces, are opposed and spaced to contact and frictionally hold an elongate capacitor body therebetween, supported in fixed position therebetween by an interposed jig member to form an assembly. While held in such fixed position, the assembly of the plurality of capacitor bodies and the wide flat contact surfaces of the leads are dipped into a solder bath to solder each pair of leads to each capacitor body, and finally are dipped into an insulating composition, such as epoxy, dried and finally separated from the carrier(s).

Since the conductive leads are centered at the ends of the capacitor body and are wider in a direction perpendicular to the axis of the capacitor body, they have increased strength and resistance to bending in that direction. While the leads are thinner in the direction corresponding to the axis of the capacitor body, this is not a problem because the capacitor is attached to the circuit board by both leads aligned in such direction.

BRIEF DESCRIPTION OF THE DRAWING

FIG. 3 is a view taken along the line 3—3 of FIG. 2;

FIG. 4 is similar to the view of FIG. 3 but illustrates the presence of the second lead carrier strip in the pressure jig assembly;

FIG. 5 is a side view of a soldered capacitor produced according to the present invention, one lead thereof still being attached to its base carrier strip;

FIG. 6 is a side view of a finished capacitor produced according to the present invention, and FIG. 7 is an end view of the capacitor of FIG. 6.

DETAILED DESCRIPTION

Figure 2:
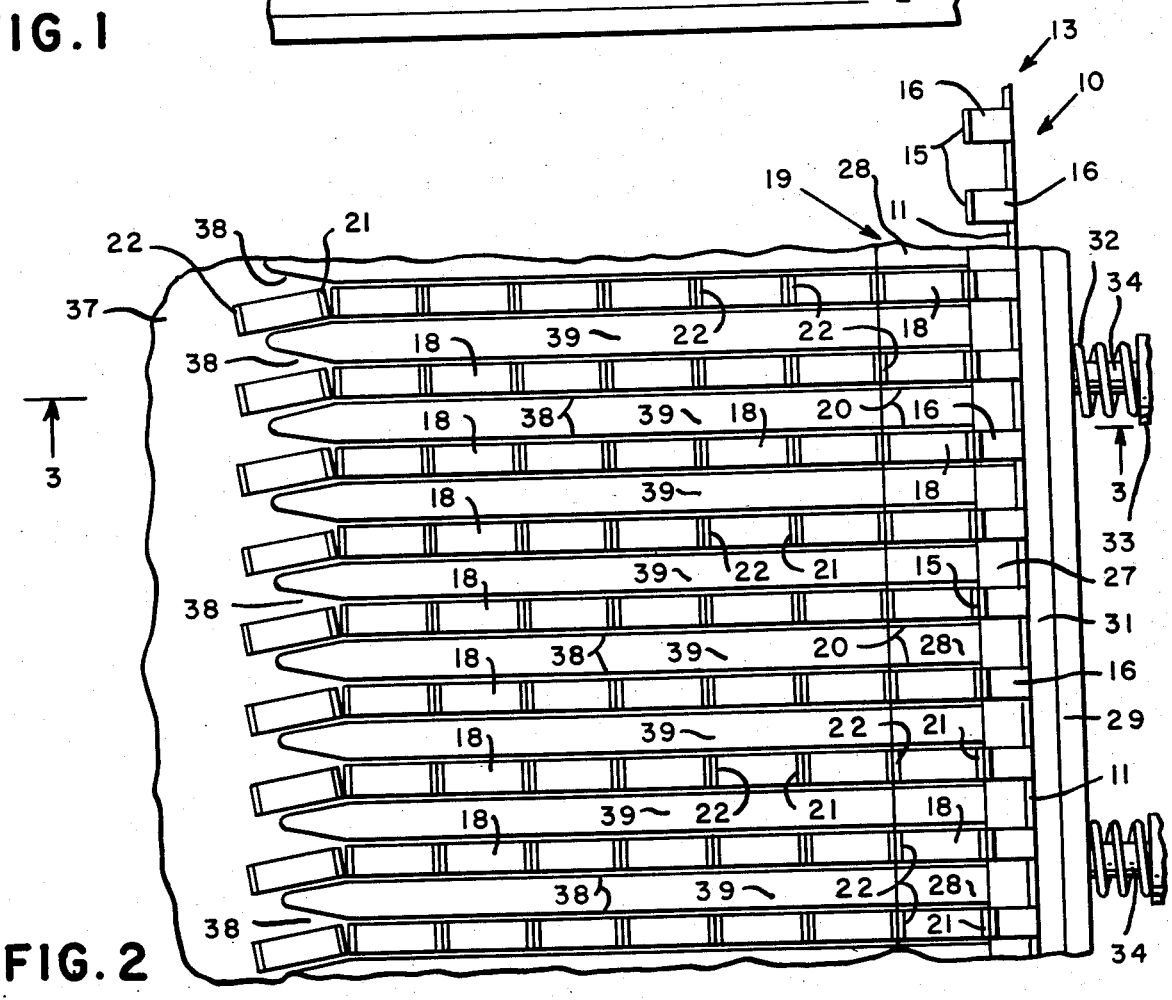
FIG. 2 is a plan view of the jig assembly of FIG. 1 aligned with a capacitor body alignment and supply tray, illustrating the automatic feeding of an elongate capacitor body to each of the receiving stations of the jig member.

The novel capacitors of the present invention preferably are produced in an in-line process through the use of a pair of spaced lead carriers or sprocketed ribbons 10, 10a, as shown by the drawing. Such lead carriers 10, shown in FIG. 2, and 10a, shown in FIG. 4, may be identical or mirror-reverse duplicates, as illustrated, and carry a plurality of parallel lead elements 13, each of which on carrier 10 is opposed to and faces an identical lead 13a on carrier 10a in perfect alignment and perfect spacing to engage and frictionally retain an elongate capacitor body therebetween, as shown by FIG. 4.

Figure 1:
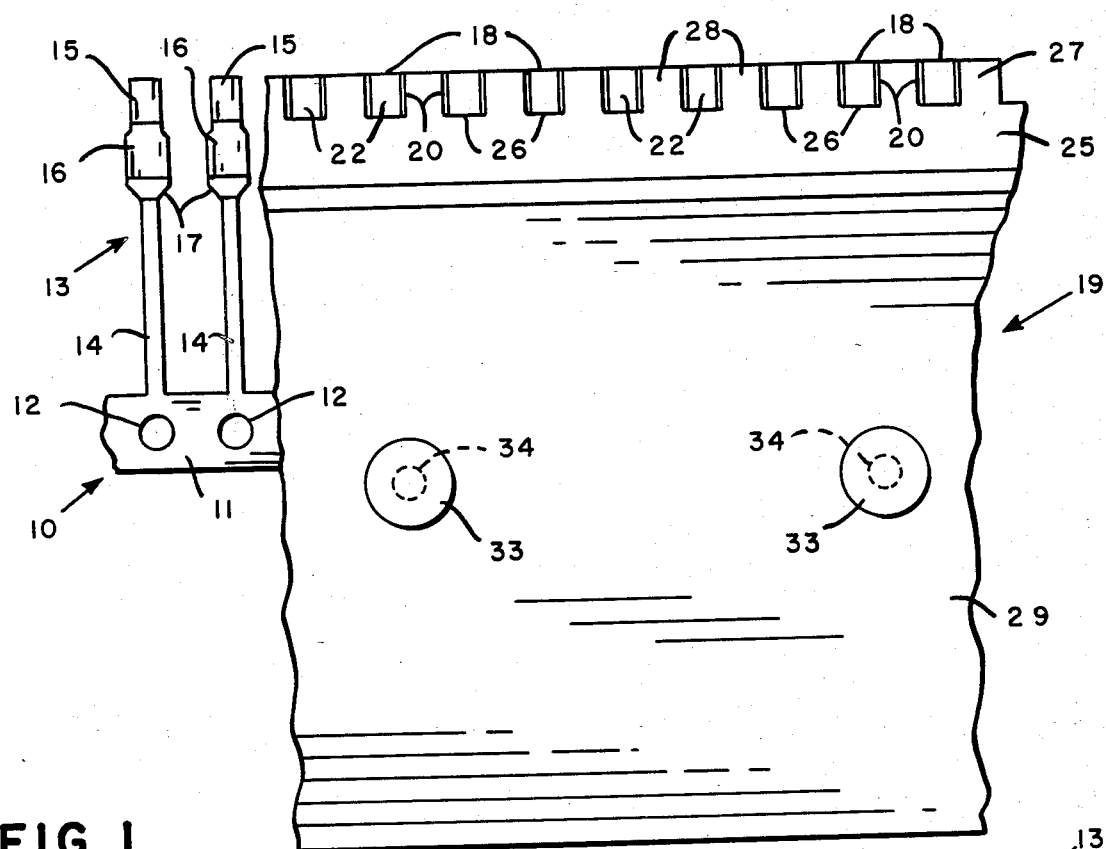
FIG. 1 is a partial side view of a pressure jig assembly supporting an elongate lead strip and a plurality of spaced capacitor bodies at an intermediate stage according to one embodiment of the present invention.

Referring to FIGS. 1 and 4, the integral lead carriers 10 and 10a each comprise an elongate sprocketed ribbon base 11, 11a having a plurality of evenly-spaced sprocket holes 12, 12a. Integral with the base 11, 11a are a plurality of upstanding, parallel, evenly-spaced conductive lead elements 13, 13a, each having a narrow lower leg portion 14, 14a, an upper wide contact face portion 15, 15a, and a pair of shoulders 17, 17a which taper between said wide and narrow portions. The lead carriers 10, 10a are perfectly flat but, most preferably, the wider upper portions are bent inwardly at area 16, 16a so that the plane of the contact face portions 15, 15a is offset from the plane of the leg portions 14, 14a, as illustrated by the drawing. The lead carriers 10, 10a and their integral lead elements 13, 13a have a thickness which is less than the width of the lower leg portions 14, 14a of the lead elements 13, 13a. The present method and the apparatus used therein enables the leads 13, 13a to be assembled with the ends of the capacitor bodies, in centered position with the width of the leads transverse the axis of the capacitor body, and further enables each pair of leads to be biased against the ends of a capacitor body with sufficient tension to grip the capacitor body and hold it against the force of gravity when the assembly is turned upside-down and the capacitor body is immersed in a solder bath.

The novel method of the present invention involves the steps of providing a means for supporting a plurality of uniformly-spaced and aligned capacitor bodies 18, such as a jig member 19 having a plurality of uniformly-spaced slots 20, inserting a capacitor body 18 within each slot 20 so that the end terminals 21 and 22 of the capacitor bodies 18 are exposed at opposite sides of the slots 20, and releasably attaching the lead carriers 10 and 10a to opposite sides of the jig member in precise positions such that the contact faces 15 and 15a of the leads 13 and 13a on the opposed lead carriers 10 and 10a are pressed against the end terminals 21 and 22 of the capacitor bodies 18 with sufficient force to grip each capacitor body 18 and hold it against the force of gravity when the assembly is inverted. In this manner the plurality of capacitor bodies 18, each compressed between the contact faces 15, 15a of a pair of leads 13, 13a can be immersed below the surface of a liquid solder bath to wet the faces 15, 15a and the end terminals 21, 22 with conductive solder 23 which is repelled by and does not wet the other surfaces of the capacitor bodies 18. Thereafter, the lead carriers 10 and 10a, which are united by the soldered capacitor bodies 18, are released from attachment to the jig member 19, and the capacitor bodies 18 are coated with an insulation coating 24 such as by heating them and dipping them into a fluidized bed of epoxy resin to form an encapsulation insulation coating 24, as shown by FIGS. 6 and 7 of the drawing.

FIGS. 1 to 4 of the drawing illustrate specific apparatuses which may be used to carry out steps of the present process but the process should not be considered to be limited to the use of such elements. In FIG. 1 the means for supporting the aligned capacitor bodies is an elongate portable jig member 19 of sufficient length to receive and support about 100 capacitor bodies 18. The jig member 19 comprises a central vertical metallic jig body 25 having a plurality of uniformly-spaced-and-sized transverse slots 26 which are present along the top edge 27 of the jig body 25 and are spaced by a plurality of uncut areas or projections 28. The transverse slots 26 are longer than they are wide, to correspond to the dimensions of the capacitor bodies 18.

The jig member 19 also includes elongate clamping members 29 and 30 which are attached to the jig body 25, at each side thereof, and are spring-urged thereagainst in order to receive and press the elongate lead carrier 10 and 10a against the jig body 25 in aligned positions so that the contact faces 15 and 15a of opposed leads 13 and 13a on the respective carriers 10 and 10a are pressed against the end terminals 21 and 22 of a capacitor body 18 with sufficient force to hold the capacitor bodies 18 in place when the portable jig member 19 is turned upside down. The clamping members 29 and 30 each comprise an elongate rubber strip 31 which presses against the lead carriers 10 and 10a, respectively, the pressure being provided by coil springs 32 confined between the outer surfaces of the members 29 and 30 and the enlarged heads 33 on the bolt member 34 which engages the jig body 25 and supports the clamp members 29 and 30 for free movement thereon. When the bottom edges of the clamping members 29 and/or 30 are pinched or squeezed together, the members 29 and/or 30 pivot about the elongate flanges 35 and 36 which extend along the bottom edges of the jig body 25, on both sides thereof to compress the springs 32 and move the rubber strip 31 on each of the members 29 and 30 out of contact with the jig body 25 to permit insertion or removal of the lead carriers 10 and/or 10a.

FIGS. 2 and 3 of the drawing illustrate a convenient means for automatically loading capacitor bodies 18 into the receiving slots 26 of the jig element 19 of FIG. 1. Thus a first lead carrier 10, preferably one having the leads 13 provided with inward bends 16 to displace the plane of the contact faces 15 inwardly of the plane of the lower leg portions 14, is inserted within clamping member 29 to hold the carrier 10 in position such that the contact face 15 of each lead 13 covers an end of a slot 26, as shown by FIGS. 1, 2 and 3. Then the assembly is mounted in vertical position adjacent a shallow horizontal vibration tray 37 having a plurality of elongate guide tracks 38 between guide guide walls 39, tracks 38 having a width, depth and spacing similar to the receptor slots 26 on the jig member 19. A plurality of elongate capacitor bodies 18 of square cross-section and having end terminals 21 and 22 are placed within the vibration tray 37 and the tray is gently vibrated to cause the capacitor bodies 18 to enter each of the elongate tracks 38 and to move out into an empty jig slot 26 until an end terminal, 21 or 22, makes contact with the contact face 15 of a lead 13 positioned to close the opposite end of each jig slot 26, as shown by FIGS. 2 and 3. Tray tracks 38 are more narrow than the length of the capacitor bodies 18 and therefore each body 18 is properly oriented lengthwise when it moves into a jig slot 26.

After each of the jig slots 26 has been loaded with a capacitor body 18, the vibration tray 37 is removed from the jig member 19, the second clamping member 30 is pressed into open position and the second lead carrier 10a is inserted in alignment and clamped so that the contact face 15a of each of the leads 13a of carrier 10a is pressed against the end terminal 22 of the capacitor bodies 18 exposed at the open end of the jig slots 26. This compresses each of the capacitor bodies 18 between a pair of contact faces 15, 15a of opposed leads 13, 13a under tension produced by the clamp springs 32 and also by the flexibility of the leads themselves, as illustrated by FIG. 4.

The portable jig member 19 carrying the assembled lead carriers 10 and 10a and the plurality of capacitor bodies 18 can be inverted and dipped into a bath of liquid solder without any movement of the capacitor bodies. The contact faces 15 and 15a and the end terminals 21 and 22 have an affinity for the solder composition and are wetted thereby while the remaining portions of the capacitor bodies 18 and the jig body 25 repel and shed the solder composition.

After the solder dries to permanently bond the lead contact faces 15 and 15a to the end terminals 21 and 22, respectively, the soldered assembly can be removed as a unit from the clamping jig member 19. Before or after removal the soldered assembly is inverted and dipped into an insulation composition, such as a fluidized bed of curable epoxy powder, and thereafter cured and dried to form an insulating encapsulation cover 24 over each of the capacitor bodies 18 and the portions of the leads 13 and 13a in contact therewith, as shown by FIGS. 6 and 7.

The uniform support and alignment of both the capacitor bodies 18 and of the lead carriers 10 and 10a and their contact faces 15 and 15a by the clamping jig 19 during the assembly of the present capacitors produces uniform capacitors in which the capacitor body 18 is attached to the leads 13 and 13a at a position well above the location of the lead shoulders 17 and 17a. This provides uniform stand-off or spacing between the underside of the insulating cover 24 and the surface of the printed wiring board when the lead legs 14 and 14a are inserted through narrow holes therein until the wider shoulders 17 and 17a engage the board and the capacitor is soldered in place.

The final capacitors, shown in the end view of FIG. 7, have the conductive lead elements 13 and 13a connected thereto in a direction corresponding to the axis of the capacitor body so that the widest and strongest areas of the leg portions 14 and 14a of the lead elements 13 and 13a extend in a direction perpendicular to or transverse the axis of the capacitor body. This gives the present capacitors increased strength and resistance to tilting or bending in such direction under the stress and heat of installation.

Depending upon the width of the capacitor bodies 18 used and the spacing provided therebetween by the projections 27 on the jig member 19, it may be necessary to sever alternate lead legs 14 and 14a adjacent each of the carrier strip base ribbons 11 and 11a, after the soldering step but prior to the encapsulation step, so that one-half of the total number of soldered capacitors remain integral with each of the carrier strips 10 and 10a. This provides alternate empty spaces between each of the capacitor bodies on each of the strips and facilitates the application of the insulation coating or cover 24 to each of the individual capacitor bodies without any unintended spreading or merging of the encapsulation composition between adjacent capacitor bodies on the same carrier strip.

As this invention may be embodied in several forms without departing from the spirit or essential character thereof, the present embodiments are illustrative and not restrictive. The scope of the invention is defined by the appended claims rather than by the description preceding them and all embodiments which fall within the meaning and range of equivalency of the claims are, therefore, intended to be embraced by those claims.

I claim:

1. Method for manufacturing a plurality of monolithic ceramic capacitors comprising the steps of providing a pair of parallel lead carriers formed from thin flat conductive metal, each of said carriers comprising an elongate base strip and a plurality of uniformly-spaced, parallel lead elements extending upwardly therefrom, each said lead element having a leg portion removably-connected to said base strip and an upper contact face portion and having a width greater than its thickness, aligning and spacing said parallel lead carriers so that the contact faces of lead elements on each of said lead carriers face each other and are spaced by a distance similar to the length of an elongate capacitor body to form opposed lead pairs, supporting an elongate capacitor body with its end terminals in predetermined fixed position against the contact faces of the lead elements of each said lead pair, pressing the lead elements of each said lead pair against the end terminals of each said capacitor body with sufficient force to form an assembly in which each said capacitor body is held in place against the effects of gravity, inverting said assembly and immersing said capacitor bodies in a bath of liquid solder to form conductive solder connections in predetermined fixed positions between the contact face portions of each of said lead elements and an end terminal of a capacitor body whereby each said opposed lead pair is soldered to a capacitor body and the width of the leg portions of said lead elements extends in a direction perpendicular to the axis of the elongate capacitor bodies, and disconnecting the leg portions of said lead elements from said lead carriers at a location adjacent the base strips thereof.

2. Method according to claim 1 which comprises coating each of said capacitor bodies and the portions of the lead pairs soldered thereto with an insulating cover while at least one of the lead elements of each said lead pair is still connected to one of said lead carriers.

3. Method according to claim 2 which comprises heating said capacitor bodies and lead pair portions, immersing the heated bodies and portions in a fluidized bed of particles of curable insulation resin and cooling to form said insulation covers.

4. Method according to claim 1 in which each of said lead elements comprises a narrow leg portion, a wider contact face portion and at least one shoulder bridging said narrow and wider portions and supporting each elongate capacitor body in predetermined fixed position against each lead element at a uniform location above said shoulder so that the shoulders are present on each opposed lead pairs at locations below the capacitor body.

5. Method according to claim 1 which comprises arranging a plurality of uniformly-spaced and uniformly-aligned elongate capacitor bodies on a portable elongate support member having a width similar to the length of the capacitor bodies, aligning and supporting one of said pair of carrier strips adjacent each side of said support member with the contact faces of each of the lead elements present on said carrier strips in contact with an end terminal of a said capacitor body so that each said capacitor body is contacted by a said opposed lead pair, and pressing both of said carrier strips against said elongate support member to form a portable assembly in which each of said capacitor bodies is held between a said opposed lead pair with sufficient force to hold them against the effects of gravity.

6. Method according to claim 5 in which said elongate support member is provided with a plurality of uniformly-spaced transverse slots which are open at each side of said support member, aligning and supporting one of said lead carriers against one side of said support member so that the contact face portions of each of the lead elements thereon cover the opening on one side of each of said transverse slots, automatically feeding a said elongate capacitor body lengthwise into the open side of each of said slots to move an end terminal thereof into contact with each of said lead contact face portions, and aligning and supporting the other lead carrier on the other side of the elongate support member so that the contact face portions of each of the lead elements thereon cover the opening on the other side of each of said transverse slots and contact the other end terminal of said capacitor bodies.

7. Method according to claim 1 in which the upper contact face portions of each of said lead elements is bent into a plane inwardly of the plane of the lower leg of portions, in the direction of each of said capacitor bodies.

8. Method according to claim 1 in which the parallel lead elements on each of said carrier strips are closely spaced, and alternate leg portions of the lead elements on each of the carrier strips are disconnected from the base strips to leave void areas, after the soldering step, and the lead carriers are separated from each other with each lead carrier supporting one-half of the total number of soldered capacitor bodies, each uniformly-spaced from the next by a void area.

* * * * *